(12) United States Patent
Othmer et al.

(10) Patent No.: US 9,002,486 B1
(45) Date of Patent: Apr. 7, 2015

(54) AUDIO SYSTEMS AND METHODS

(75) Inventors: Konstantin Othmer, Mountain View, CA (US); Michael P. Ruf, Parkland, FL (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 975 days.

(21) Appl. No.: 12/423,592

(22) Filed: Apr. 14, 2009

(51) Int. Cl.
 *G06F 17/00* (2006.01)
 *G06Q 10/06* (2012.01)
(52) U.S. Cl.
 CPC .............................. *G06Q 10/06311* (2013.01)
(58) Field of Classification Search
 USPC .......................... 700/94; 369/4; 704/500–504
 See application file for complete search history.

(56) References Cited

U.S. PATENT DOCUMENTS

| | | | | |
|---|---|---|---|---|
| 5,729,741 A * | 3/1998 | Liaguno et al. | | 1/1 |
| 2007/0162971 A1 * | 7/2007 | Blom et al. | | 726/17 |
| 2007/0198632 A1 * | 8/2007 | Peart et al. | | 709/203 |
| 2009/0094034 A1 * | 4/2009 | Yoshida | | 704/260 |
| 2013/0282827 A1 * | 10/2013 | Singh et al. | | 709/204 |

* cited by examiner

*Primary Examiner* — Andrew C Flanders
(74) *Attorney, Agent, or Firm* — Workman Nydegger

(57) ABSTRACT

An audio recorder may be configured to automatically send a copy of recorded audio to one or more destinations, such as, one or more default destinations associated with the audio recorder. The audio recorder may be configured to use a wireless connection to send the copy of the recorded audio. For instance, the audio recorder may form part of a wireless communication device that may be configured to send the copy of the recorded audio via one or more wireless connections and/or wireless networks to suitable destinations.

14 Claims, 3 Drawing Sheets

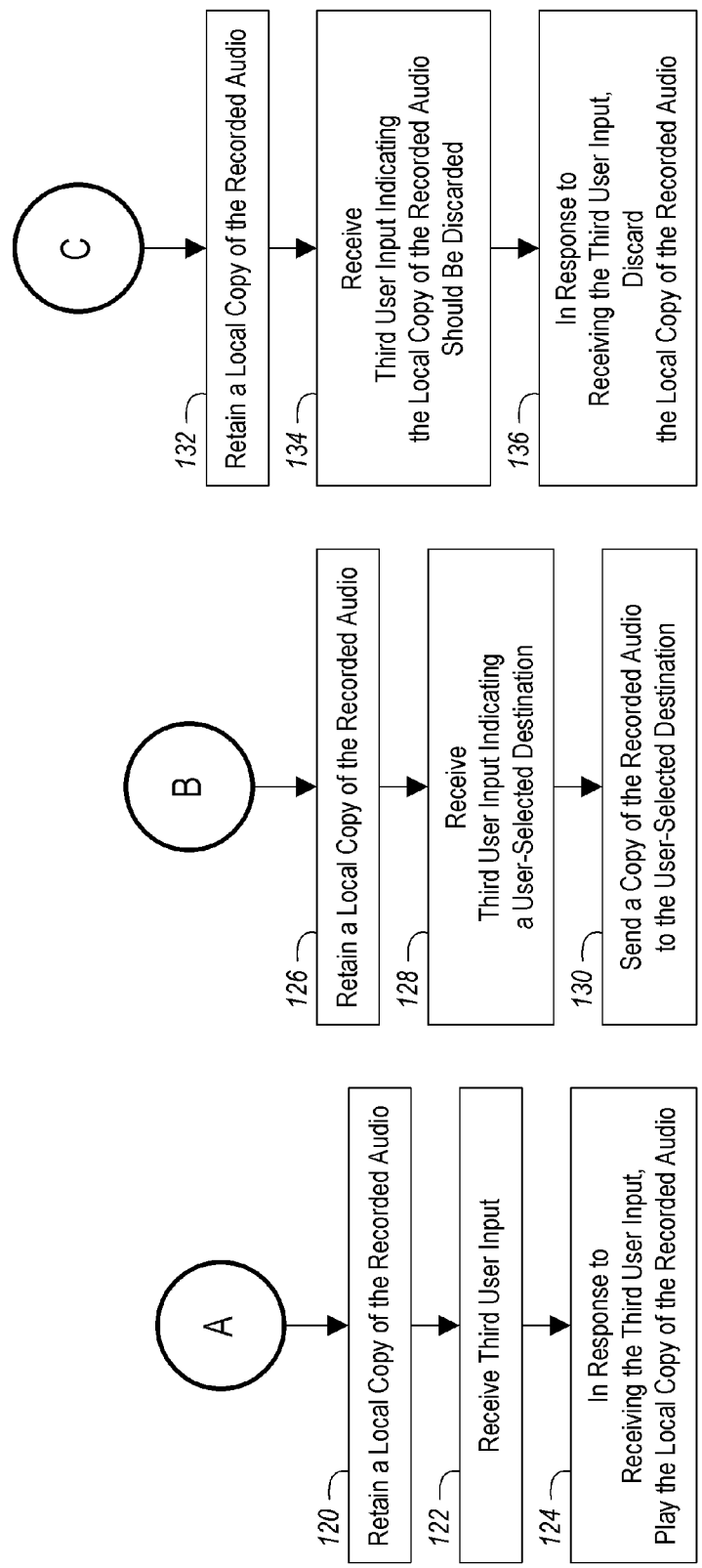

AUDIO SYSTEMS AND METHODS

BACKGROUND OF THE INVENTION

1. Field of the Invention

The present invention generally relates to audio systems and methods and, in particular, to audio recorders.

2. Background Technology

People may use audio recorders in a variety of circumstances. For example, a person may use an audio recorder at a business meeting to ensure that the meeting's details are preserved. Also, a person may use an audio recorder to make a "note to self" when, for instance, pen and paper are not readily accessible.

Too often, the recorded audio is listened to only after it has lost its relevance or utility.

SUMMARY

A need therefore exists for systems and methods that eliminate or reduce the disadvantages and problems listed above and/or other disadvantages and problems.

One aspect is an audio recorder that may be configured to automatically send a copy of recorded audio to one or more destinations, such as, one or more default destinations associated with the audio recorder. Exemplary default destinations may include an email account, a server, and/or any other suitable destinations. Significantly, this may be used to automatically add the recorded audio into a person's workflow, increasing the likelihood that the audio will be reviewed and, if necessary, acted upon.

A further aspect is the audio recorder may be configured to use a wireless connection to send the copy of the recorded audio. For instance, the audio recorder may form part of a wireless communication device that may be configured to send the copy of the recorded audio via one or more wireless connections and/or wireless networks to suitable destinations. Significantly, this may make it even easier to add the recorded audio into a person's workflow.

Another further aspect is the audio recorder may be configured to retain a local copy of the recorded audio. This may allow a user to play the recorded audio and/or send the recorded audio to additional recipients or destinations. The audio recorder may also be configured to discard the local copy in response to user input or, if desired, automatically discard the local copy after a copy is sent to a default destination associated with the audio recorder.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which:

FIG. 3 is a flowchart illustrating an exemplary method;
FIG. 4 is a flowchart illustrating an exemplary method;
and
FIG. 5 is a flowchart illustrating an exemplary method.

DETAILED DESCRIPTION OF THE PREFERRED EMBODIMENTS

Figure 1:
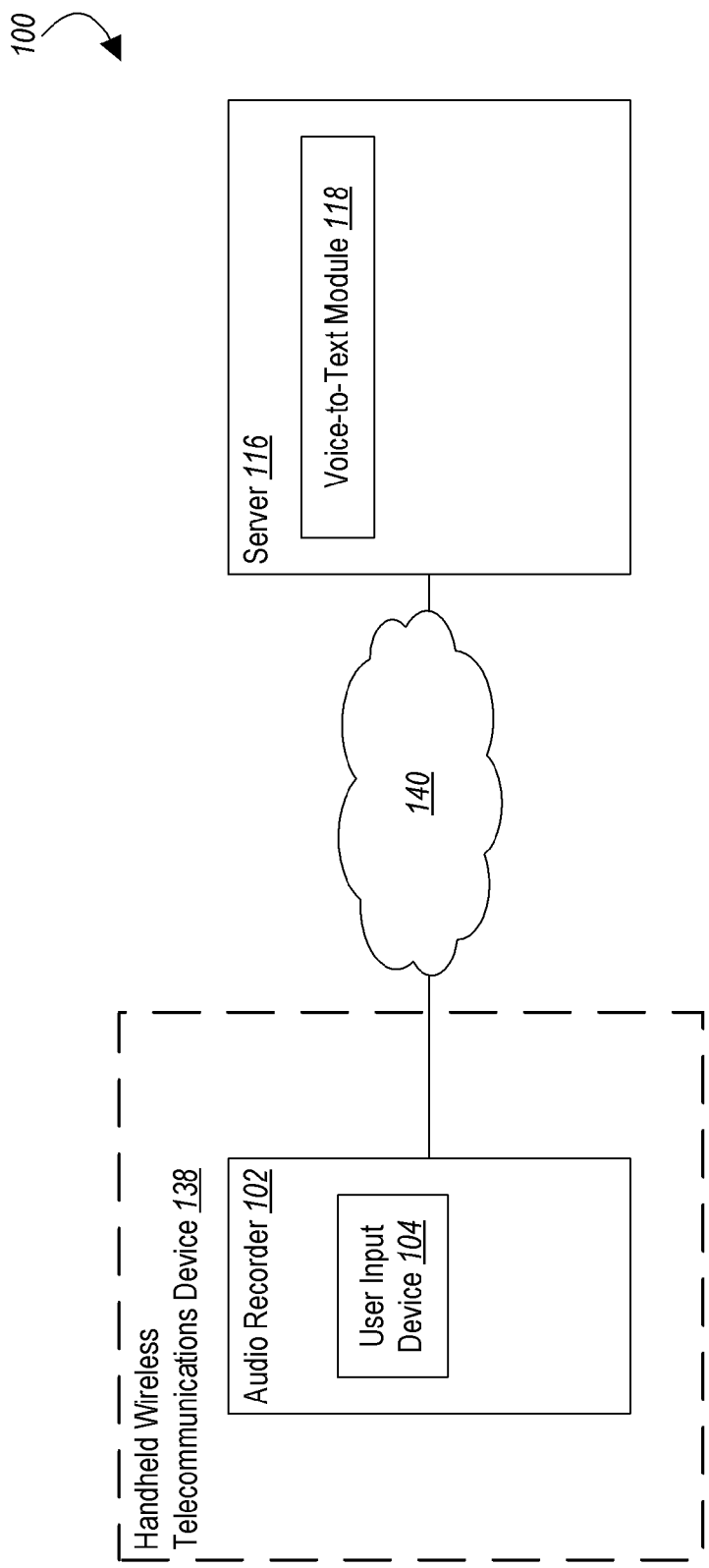
FIG. 1 is a block diagram of an exemplary system.

As shown in FIG. 1, a system 100 may include an audio recorder 102. The audio recorder 102 may include, or be connected to, one or more user input devices 104, such as buttons, microphones, keyboards, keypads, click wheels, mice, mouse touch pads, mouse knobs, mouse balls, mouse roller wheels, touch-sensitive screens (such as touch screens, touch pads, and the like), video cameras, and other user input devices. If desired, the audio recorder 102 may be a handheld audio recorder. The audio recorder 102, however, need not be handheld and may have any suitable size and/or configuration.

Figure 2:
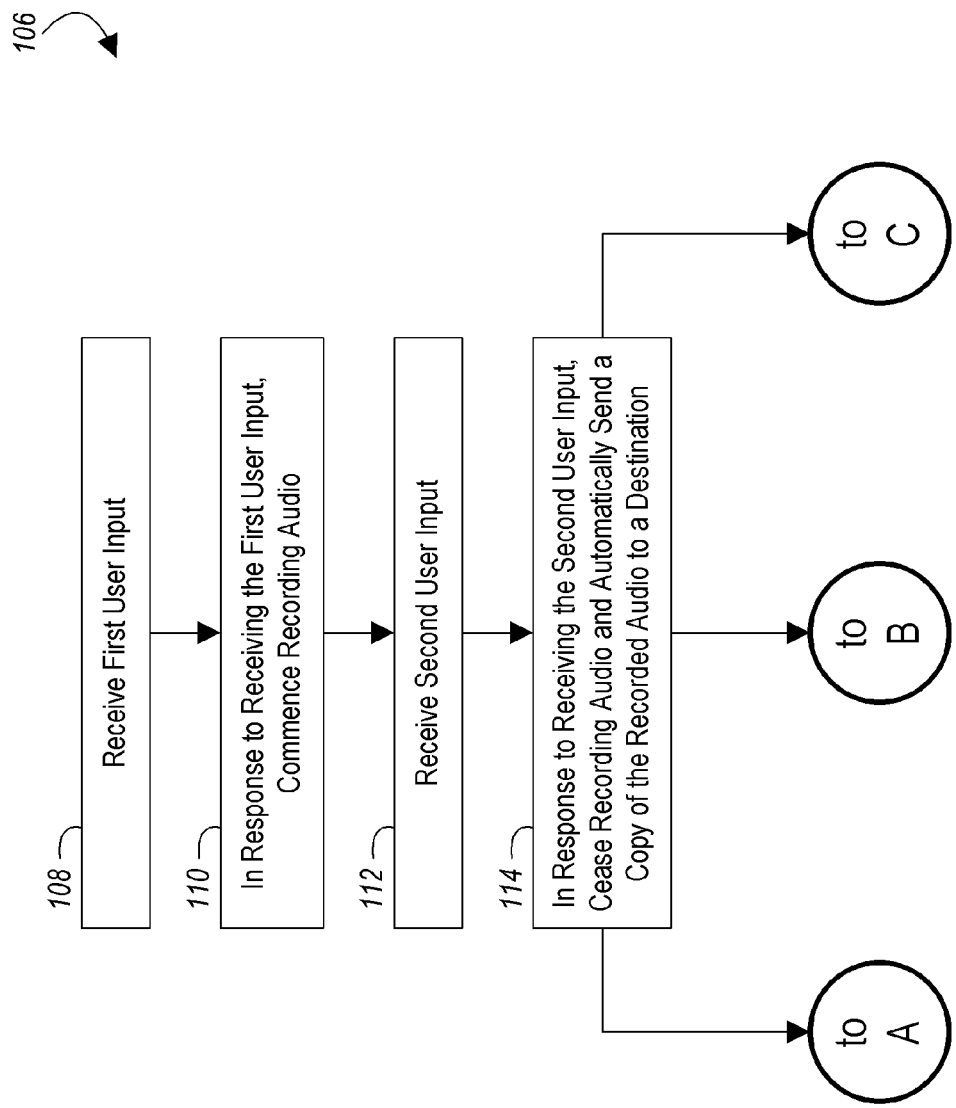
FIG. 2 is a flowchart illustrating an exemplary method.

The audio recorder 102 may be configured to perform all or a portion of a method 106 shown in FIG. 2. In further detail, at a block 108, the audio recorder 102 may receive first user input, and at a block 110, commence recording audio in response to receiving the first user input. At a block 112, the audio recorder 102 may receive second user input, and at a block 114, cease recording audio and automatically send a copy of the recorded audio to a destination in response to receiving the second user input. In some instances, the user input devices 104 may include a button, and the first user input may be received via a first press and release of the button, and the second user input may be received via a second press and release of the button. In some instances, the first user input may be received via a press of the button, and the second user input may be received via a release of the button. The first and second user inputs, however, may be received using other suitable user input devices 104 and in any suitable fashion.

If desired, at the block 114, the audio recorder 102 may cease recording audio and automatically send a copy of the recorded audio to one or more default destinations associated with the audio recorder 102. As shown below, a default destination associated with the audio recorder 102 could be a destination that allows the content of the recorded audio to be automatically added into a person's workflow. Significantly, this may increase the likelihood that the audio will be reviewed and acted upon.

In further detail, a default destination associated with the audio recorder 102 could be an email account. For example, at the block 114, the audio recorder 102 could create and automatically email an audio file that includes the recorded audio to an email address associated with the audio recorder 102—such as an email address of a user of the audio recorder 102, the user's secretary, a transcription service, etc.

A default destination associated with the audio recorder 102 could be a server 116 configured to convert at least a portion of the recorded audio to text. For example, at the block 114, the audio recorder 102 could create and automatically send an audio file that includes the recorded audio to a server 116, which may include a voice-to-text module 118. The voice-to-text module 118 could convert at least a portion of the recorded audio in the audio file to text. If desired, the server 116 could add the text to a new or preexisting task list item; calendar item; note item; contact item; draft email in a personal information manager (e.g., Microsoft Outlook™), such as in the user account of a user of the audio recorder 102, the user's secretary, etc.; digital diary, audio blog, or social networking web site.

A default destination associated with the audio recorder 102 could be a server 116 configured to determine whether the recorded audio includes a voice command and to act upon the voice command. In further detail, at the block 114, the audio recorder 102 could create and automatically send an audio file that includes the recorded audio to a server 116, and the recorded audio may include a voice command indicating that at least a portion of the content of the recorded audio (e.g., the audio file or a text translation thereof) should be added to a new or preexisting task list item, calendar item, note item, contact item, or draft email in a personal information manager, such as in the user account of a user of the audio recorder 102, the user's secretary, etc. An exemplary command could, for instance, be "add to task list," "add to note," "add to email to John Smith," "add to digital diary," "add to audio blog," "add to Facebook.com," etc.

In some instances, automatically sending the copy of the recorded audio at the block 114 may function as an automatic-backup feature for a local copy of the recorded audio that the audio recorder 102 retains. Significantly, if the audio recorder 102 is configured to retain the local copy, a user may play and/or send the recorded audio as desired. For example, as shown in FIGS. 2 and 3, the audio recorder 102 may retain a local copy of the recorded audio at a block 120, may receive third user input at a block 122, and may play the local copy at a block 124. In addition, as shown in FIGS. 2 and 4, the audio recorder 102 may retain a local copy of the recorded audio at a block 126, may receive third user input indicating one or more user-selected destinations at a block 128, and may send a copy of the recorded audio to the user-selected destinations at a block 130. The audio recorder 102 may send the copy to the user-selected destinations via email, VoiceSMS messages (as known as Vnotes® messages), and/or any other suitable means. Exemplary user-selected destinations may include a communication device (such as a wireless telecommunication device, a personal computer, or other communication device) or any other suitable destination.

When desired, a user may later delete the local copy of the recorded audio. In particular, as shown in FIGS. 2 and 5, the audio recorder 102 may retain a local copy of the recorded audio at a block 132, may receive third user input indicating that the local copy should be discarded at a block 134, and may discard the local copy at a block 136. The audio recorder 102 is preferably configured to retain the local copy until receiving the third user input indicating that the local copy of the recorded audio should be discarded. The audio recorder 102, however, need not retain a local copy of the recorded audio and could automatically discard any local copy of the recorded audio after automatically sending the recorded audio at the block 114.

In some instances, the audio recorder 102 may use a wireless connection to automatically send the copy of the recorded audio to the destination at the block 114. For example, as shown in FIG. 1, the audio recorder 102 may form part of a wireless communication device (such as a handheld wireless telecommunication device 138) that may be configured to send the copy of the recorded audio via one or more wireless connections and/or wireless networks 140 to an email account, the server 116, and/or any other suitable destinations. Significantly, this may make it even easier to add the recorded audio into a person's workflow because, for instance, a user would not be required to locate a cable in order to send audio files from the audio recorder 102 to the user's personal computer, personal information manager, etc.

If desired, a user of the audio recorder 102 may set the destinations to which the copy of the recorded audio is sent at the block 114. For example, the audio recorder 102 could prompt a user to enter and/or modify the default destinations to which copies of each audio recording are to be sent. The user could then use the user input devices 104 to enter or modify the default destinations. By entering or modifying the default destinations, the audio recorder 102 may advantageously be configured to send each instance of recorded audio to the default destinations, for instance, according to the method 106 in FIG. 2. The destinations, however, need not be set by the user and may, for instance, be hard coded or set by a system administrator of the system 100.

In some instances, the recorded audio mentioned above may be recorded as part of recorded multimedia (e.g., a recorded movie), and the audio file may form part of a multimedia file (e.g., a movie file). For example, the audio recorder 102 could, if desired, form part of a video recorder, such as a camcorder, a wireless telecommunication device with video capabilities, or other video recorders.

If desired, the methods and systems described above may include and/or be implemented using a special purpose or general purpose telecommunication devices, including but not limited to wireless telephones; other telephony-enabled mobile devices; landline telephones; special purpose or general purpose computers that are adapted to have telecommunications or data networking capabilities (such as personal computers and cable or satellite set-top); and other telecommunication devices.

If desired, the methods and systems described above may include and/or be implemented using computer-readable media for carrying or having computer-executable instructions or electronic content structures stored thereon, and these terms are defined to extend to any such media or instructions that may be used with telecommunication devices or other communication devices.

By way of example, and not limitation, such computer-readable media can comprise RAM, ROM, EEPROM, CD-ROM or other optical disk storage, magnetic disk storage or other magnetic storage devices, or any other medium which can be used to store desired program code in the form of computer-executable instructions or electronic content structures and which can be accessed by a general purpose or special purpose computer, other computing devices, telecommunication devices or other communication devices.

The methods and systems described above require no particular component or function. Thus, any described component or function—despite its advantages—is optional. Also, some or all of the described components and functions described above may be used in connection with any number of other suitable components and functions.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system comprising:
 a handheld audio recorder configured to:
  in response to receiving first user input, commence recording audio; and
  in response to receiving second user input, cease recording audio and automatically use a wireless connection to send a copy of the recorded audio to a default destination server associated with the audio recorder; and the server configured to:
receive the copy of the recorded audio from the handheld recording device;
determine a destination for the recorded audio in a preexisting workflow item, the preexisting workflow item having been previously prepared by the user prior to recording the audio and comprising at least one of a task list item, calendar item, note item, contact item, and personal information manager item; and
insert the copy of the recorded audio or a version of the recorded audio that has been changed to a different format from the format generated by the handheld audio recorder into the preexisting workflow item such that the copy of the recorded audio is useable by the user in implementing the preexisting workflow item.

2. The system as in claim 1, wherein the audio recorder includes a button, the first user input received via a first press and release of the button, the second user input received via a second press and release of the button.

3. The system as in claim 1, wherein the audio recorder includes a button, the first user input received via a press of the button, the second user input received via a release of the button.

4. The system as in claim 1, wherein the audio recorder forms at least a portion of a handheld wireless telecommunication device.

5. A system comprising:
a handheld wireless telecommunication device including an audio recorder and a button, the audio recorder configured to:
in response to a first press and release of the button, commence recording audio; and
in response to a second press and release of the button during the recording of the audio, cease recording audio and automatically use a wireless connection to send a copy of the recorded audio to a default destination server associated with the handheld wireless telecommunication device;
the server configured to:
receive the copy of the recorded audio from the handheld recording device;
determine a destination for the recorded audio in a preexisting workflow item, the preexisting workflow item having been previously prepared by the user prior to recording the audio and comprising at least one of a task list item, calendar item, note item, contact item, and personal information manager item; and
insert the copy of the recorded audio or a version of the recorded audio that has been changed to a different format from the format generated by the handheld audio recorder into the preexisting workflow item such that the copy of the recorded audio is useable by the user in implementing the preexisting workflow item.

6. A system comprising:
a handheld wireless telecommunication device including an audio recorder and a button, the audio recorder configured to:
in response to a press of the button, commence recording audio; and
in response to a release of the button during the recording of the audio, cease recording audio and automatically use a wireless connection to send a copy of the recorded audio to a default destination server associated with the handheld wireless telecommunication device;
the server configured to:
receive the copy of the recorded audio from the handheld recording device;
determine a destination for the recorded audio in a preexisting workflow item, the preexisting workflow item having been previously prepared by the user prior to recording the audio and comprising at least one of a task list item, calendar item, note item, contact item, and personal information manager item; and
insert the copy of the recorded audio or a version of the recorded audio that has been changed to a different format from the format generated by the handheld audio recorder into the preexisting workflow item such that the copy of the recorded audio is useable by the user in implementing the preexisting workflow item.

7. The system as in claim 1, claim 5, or claim 6, wherein the audio recorder is also configured to:
retain a local copy of the recorded audio; and
in response to receiving third user input, play the local copy of the recorded audio.

8. The system as in claim 1, claim 5, or claim 6, wherein the audio recorder is also configured to:
retain a local copy of the recorded audio;
receive third user input indicating a user-selected destination; and
use a wireless connection to send a copy of the recorded audio to the user-selected destination.

9. The system as in claim 1, claim 5, or claim 6, wherein the audio recorder is also configured to retain a local copy of the recorded audio until receiving third user input indicating that the local copy of the recorded audio should be discarded.

10. The system as in claim 1, claim 5, or claim 6, wherein the default destination server is further configured to convert at least a portion of the recorded audio to text.

11. The system as in claim 1, claim 5, or claim 6, wherein the default destination server is further configured to determine whether the recorded audio includes a voice command and to act upon the voice command.

12. The system as in claim 1, claim 5, or claim 6, wherein the default destination server is further configured to determine whether the recorded audio includes a voice command and to act upon the voice command; and
wherein the voice command indicates that at least a portion of the content of the recorded audio should be added to the preexisting workflow item, the preexisting workflow item including at least one of the following: a task list item, a calendar item, a note item, a contact item, an email, a digital diary, an audio blog or a social networking website.

13. The system as in claim 1, claim 5, or claim 6, wherein the preexisting workflow item includes at least one of the following: a task list item, a calendar item, a note item, a contact item, an email, a digital diary, an audio blog or a social networking website.

14. The system as in claim 1, claim 5, or claim 6, wherein the preexisting workflow item comprises an email account.

* * * * *